United States Patent [19]
Kordecki

[11] Patent Number: 5,876,106
[45] Date of Patent: Mar. 2, 1999

[54] ILLUMINATED CONTROLLER

[75] Inventor: David L. Kordecki, Elkhart, Ind.

[73] Assignee: CTS Corporation, Elkhart, Ind.

[21] Appl. No.: 923,624

[22] Filed: Sep. 4, 1997

[51] Int. Cl.[6] .................................................. G01D 11/28
[52] U.S. Cl. .............................. 362/29; 362/84; 200/314; 338/114
[58] Field of Search .................................. 362/29, 32, 84; 338/118, 119; 200/314

[56] References Cited

U.S. PATENT DOCUMENTS

| Re. 33,089 | 10/1989 | Pepper et al. . | |
|---|---|---|---|
| 3,968,467 | 7/1976 | Lampen et al. . | |
| 4,005,381 | 1/1977 | Klug . | |
| 4,017,848 | 4/1977 | Tannas, Jr. . | |
| 4,320,268 | 3/1982 | Brown | 200/314 |
| 4,494,105 | 1/1985 | House . | |
| 4,523,174 | 6/1985 | Oyama . | |
| 4,532,395 | 7/1985 | Zukowski | 200/314 |
| 4,542,366 | 9/1985 | Oyama . | |
| 4,683,360 | 7/1987 | Maser | 200/314 |
| 4,725,817 | 2/1988 | Wihlborg . | |
| 4,939,501 | 7/1990 | Well . | |
| 4,962,364 | 10/1990 | Okuya et al. . | |
| 5,228,562 | 7/1993 | Burk . | |
| 5,241,308 | 8/1993 | Young . | |

Primary Examiner—Thomas M. Sember
Attorney, Agent, or Firm—Michael W. Starkweather; Mark P. Bourgeois

[57] ABSTRACT

An illuminated controller having a membrane potentiometer for use as a light dimmer or other voltage controlling device. The controller has a backplate that acts as a sturdy base, and a cover, having sidewalls and a top wall with a central opening. The cover is mounted on the backplate and a layered structure is interposed between the cover and backplate. The layered structure includes a membrane potentiometer for varying voltage, and an electroluminescent panel, for generating light to illuminate the controller.

17 Claims, 6 Drawing Sheets

ILLUMINATED CONTROLLER

BACKGROUND OF THE INVENTION

1. Field of the Invention

This invention relates to an illuminated controller, and more specifically to an illuminated membrane potentiometer for use as a light dimmer or other voltage controlling device.

2. Description of the Related Art

Potentiometers are well known for controlling voltage selection in numerous types of applications in both home and industry. For example, these devices may be used in the control panels of such things as aircraft and aerospace applications, computers, arcade games, kitchen appliances, or lighting systems to name a few.

In the past, prior art potentiometers for providing voltage selection have typically been operated using a mechanical wiper that is typically controlled by a knob or slider on a control panel. The wiper contacts a resistive element, which provides for voltage selection over a continuous range of voltages. The constant mechanical contact between the wiper and the resistive element tends to accelerate the wear and eventual failure of this type of potentiometer.

A more recently devised potentiometer uses a membrane comprising a continuous length of electrically resistive material, a corresponding continuous length of electrically conductive material, which serves as a wiper, and an electrically insulating spacer which serves to simultaneously support and separate the resistive and conductive layers. Either one or both of the resistive and conductive materials are designed as flexible members so that they can be pressed together at any selected location along their length to bring them into electrical contact.

If a voltage is applied across the resistive material, a voltage gradient is established along the length of the material. Thus, touching either the top or bottom surface of the flexible member will cause the resistive and conductive materials to contact each other, producing a voltage output on the conductive material or wiper. The advantage of this device is that it minimizes wiper contact and reduces wear and yet provides a continuous range of output voltage levels.

A potentiometer membrane as described can be used to make a reliable and economical dimmer and/or switch for use with a light fixture. However, since light switches and dimmers and other potentiometer controls must sometimes be found and used in poorly lit rooms, it is desirable to provide an illumination source on the control. Accordingly, it is known in the prior art to place an L.E.D on a potentiometer control (U.S. Pat. No. 4,962,364 to Okuya) or to use a photo-conductive element routed to the control knob surface (U.S. Pat. No. 4,523,174 to Oyama). However, these devices are only illuminated by a small point source of light. It is desirable to have a larger surface of the potentiometer illuminated so that it will be easier to see and softer on the eyes.

3. Related Art

Examples of patents that are related to the present invention are as follows, and each patent is herein incorporated by reference for the supporting teachings:

U.S. Pat. No. 5,241,308 is a force sensitive touch panel.

U.S. Pat. No. 5,228,562 is a membrane switch and fabrication method.

U.S. Pat. No. 5,962,364 is an illuminating type linear resistor for volume control.

U.S. Pat. No. 4,939,501 is a sliding foot controller.

U.S. Pat. No. 4,725,817 is a pressure responsive panel.

U.S. Pat. No. 4,542,366 is an illuminated variable resistor.

U.S. Pat. No. 4,523,174 is an illumination type rotary variable resistor.

U.S. Pat. No. 4,494,105 is a touch controlled circuit apparatus for voltage selection.

U.S. Pat. No. 4,017,848 is a transparent keyboard switch and array.

U.S. Pat. No. 4,005,381 is a slide potentiometer.

U.S. Pat. No. 3,968,467 is a touch controlled voltage-divider device.

U.S. Pat. No. Re. 33,089 is a position sensing and indicating device.

The foregoing patents reflect the state of the art of which the applicant is aware and are tendered with the view toward discharging applicant's acknowledged duty of candor in disclosing information which may be pertinent in the examination of this application. It is respectfully stipulated, however, that none of these patents teach or render obvious, singly or when considered in combination, applicant's claimed invention.

SUMMARY OF THE INVENTION

It is a feature of the invention to provide an illuminated controller having a membrane potentiometer for use as a light dimmer or other voltage controlling device.

An additional feature of the invention is to provide a device that has a backplate, to act as a sturdy base, and a cover that has sidewalls and a top with a central opening. The cover is mounted on the backplate and a layered structure is interposed between the cover and backplate. The layered structure includes a membrane potentiometer for varying voltage, and an electroluminescent panel, for generating light to illuminate the controller.

A further feature of the invention is to provide a device with a transparent cover so that light from the electroluminescent panel can be transmitted therethrough.

Yet another feature of the invention is to provide an illuminated controller wherein electrical terminations for both the membrane potentiometer and electroluminescent panel are mounted on common film layers.

The invention resides not in any one of these features per se, but rather in the particular combination of all of them herein disclosed and claimed and it is distinguished from the prior art in this particular combination of all of its structures for the functions specified. Other features of the present invention will become more clear from the following detailed description of the invention, taken in conjunction with the accompanying drawings and claims, or may be learned by the practice of the invention.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Figure 1:
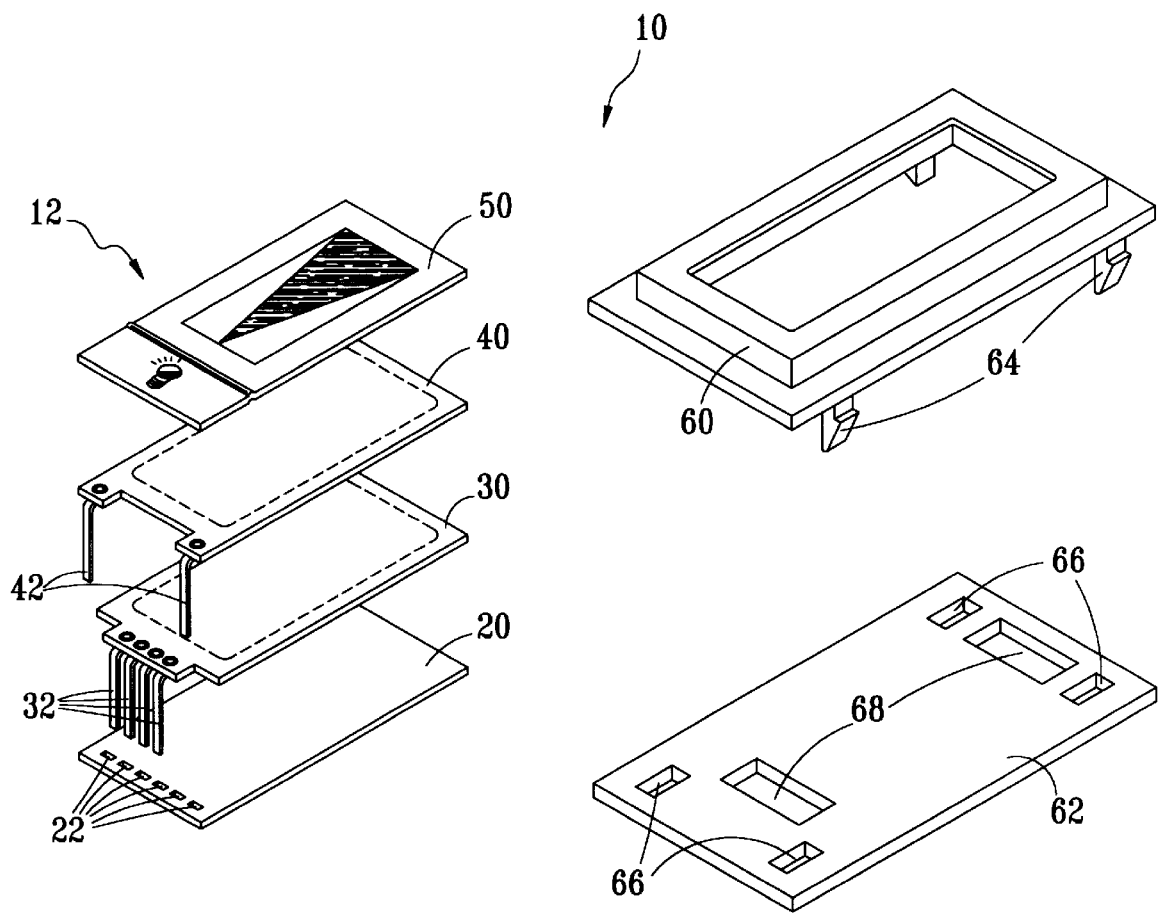
FIG. 1 is an exploded perspective view of a first embodiment of a luminescent controller.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the use of the accompanying drawings. In the drawings, like numbering represent like elements between the drawings.

DETAILED DESCRIPTION OF THE PREFERRED EMBODIMENT

The present invention provides a luminescent controller for use as a light dimmer or similar application. Regarding FIG. I and FIG. 2, there is a luminescent controller 10 having a backplate 62 and a cover 60. Interposed between backplate 62 and cover 60 is a layered structure 12. Layered structure 12 includes a stiffener board 20, a membrane potentiometer 30, electroluminescent panel 40, and a transparent sheet with graphic overlays 50. Controller 10 is held together by locking tabs 64 which releasably locks into holes 66.

Membrane potentiometer 30 and electroluminescent panel 40 have electrical connectors 32 and 42, respectively. Connectors 42 are designed to fit on either side of aligned connectors 32 when layered structure 12 is assembled. Furthermore, connectors 32 and 42 are designed to be inserted through holes 22 and slot 68. The connectors can then be connected to a circuit board (not shown) having dimmer control electronics (not shown) which are well known in the art. Membrane potentiometer 30 includes a two flexible film layers 31, conductive layer 32 and a resistive layer 34, which are separated by dielectric 36, thereby forming air space 38.

The light 64 generated by electroluminescent panel 40 is transmitted through transparent layer 50 to illuminate controller 10. The details of panel 40, which are well known in the art, are depicted in FIG. 4.

Figure 3:
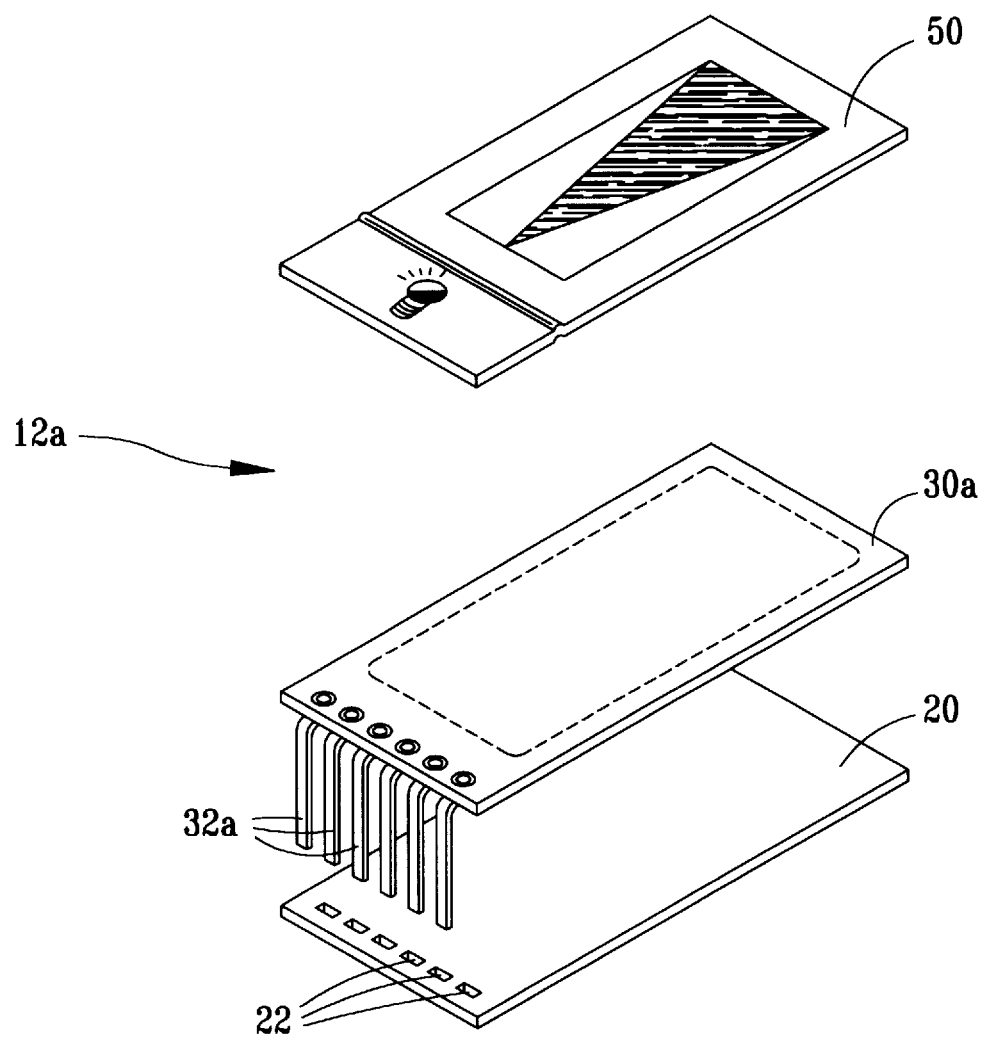
FIG. 3 is an exploded perspective view of a second embodiment of a the layered structure of the luminescent controller.
Figure 4:
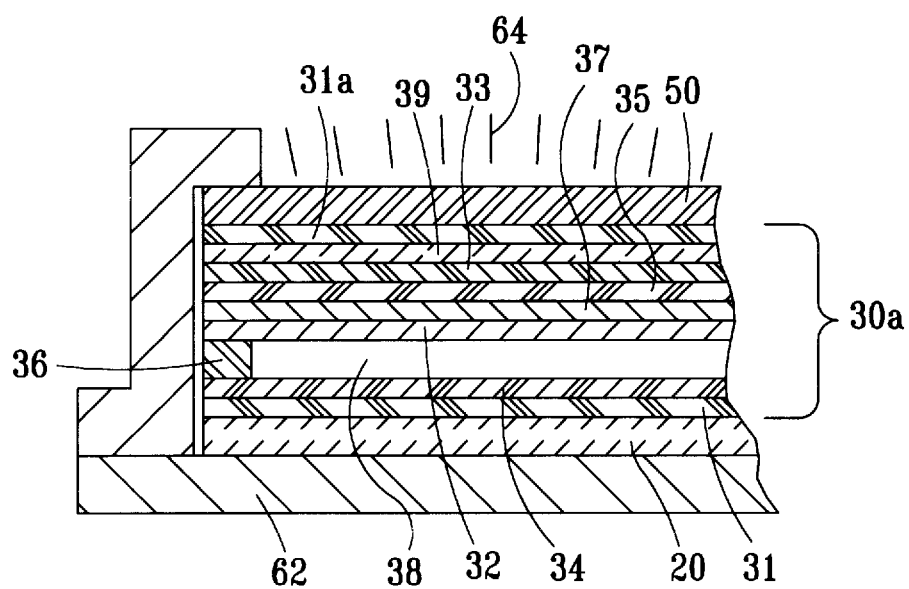
FIG. 4 is a cross section of the layered structure of FIG. 3 taken transverse to the longitudinal direction.

In FIGS. 3 and 4, another embodiment of the invention is shown. This embodiment is similar to the embodiment shown in FIG. 1, except that in layered structure 12a, the electroluminescent panel is incorporated into membrane potentiometer 30a. Membrane potentiometer 30a includes a transparent flexible film layer 31a, which can be made from a polyester film such as Mylar. Film layer 31a is coated with a transparent conductive coating 39 such as Indium Tin Oxide (ITO). On top of the ITO, a layer of electroluminescent material 33 such as phosphor is applied. Over layer 33, an electrically insulative material layer 35, like Barium Titanium Oxide, is deposited. The final layer of membrane 30a consists of a screen deposited conductor layer 37. The lighting of membrane 30a is produced when an alternating voltage is applied to ITO layer 39 and conductive layer 37. The voltage creates a capacitive effect thereby exiting and illuminating electroluminescent material layer 33.

Figure 2:
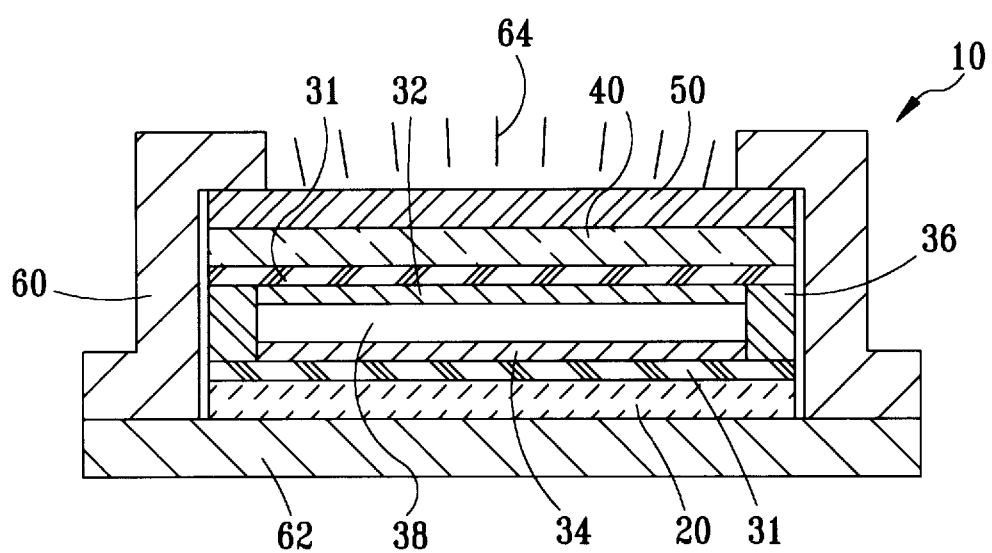
FIG. 2 is a cross section of the luminescent controller of FIG. 1 taken transverse to the longitudinal direction.

The remaining portion of membrane potentiometer 30a is similar to that in FIG. 2. Connectors 32a are a combination of both connectors 32 and 42 shown in FIG. 1. Additionally, connectors 32a are mounted on film layers 31 and 31 a, which form the outer layers of and are common to both membrane potentiometer 30a and the electroluminescent panel contained therein.

Figure 5:
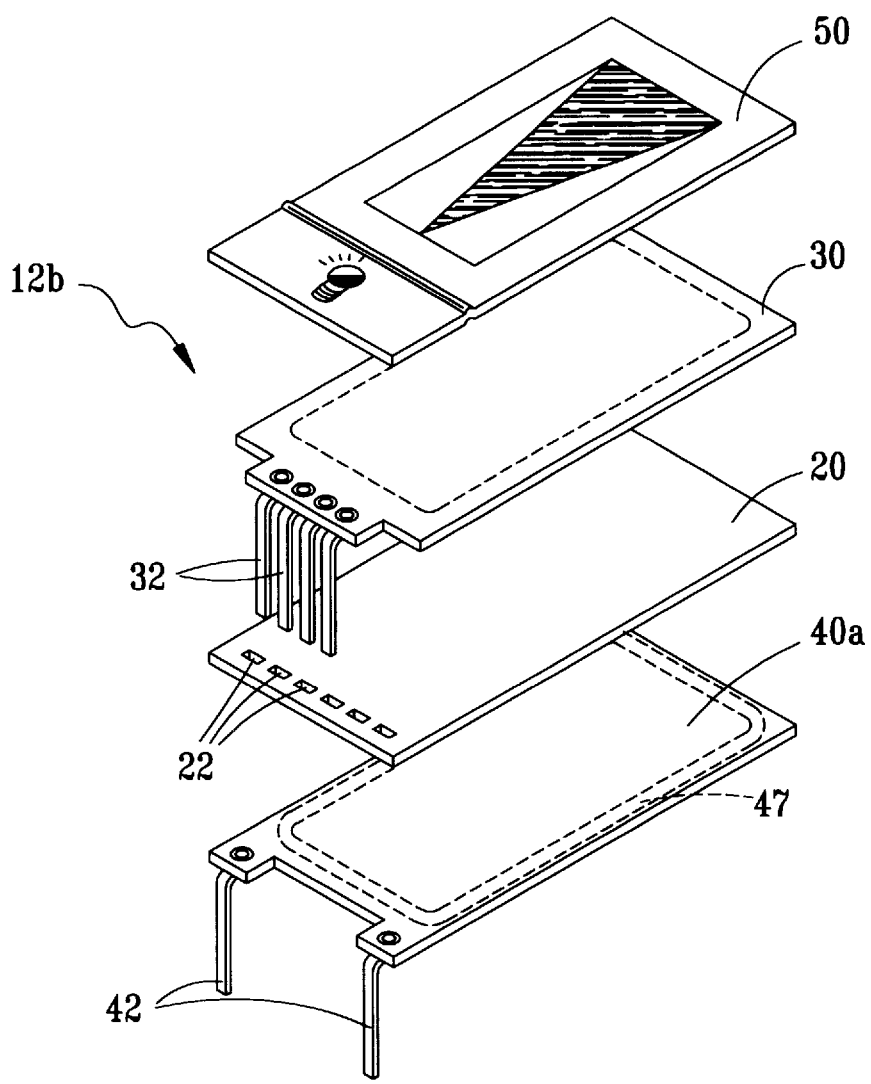
FIG. 5 is an exploded perspective view of a third embodiment of a layered structure for a luminescent controller having an electroluminescent panel that lights up a cover.
Figure 6:
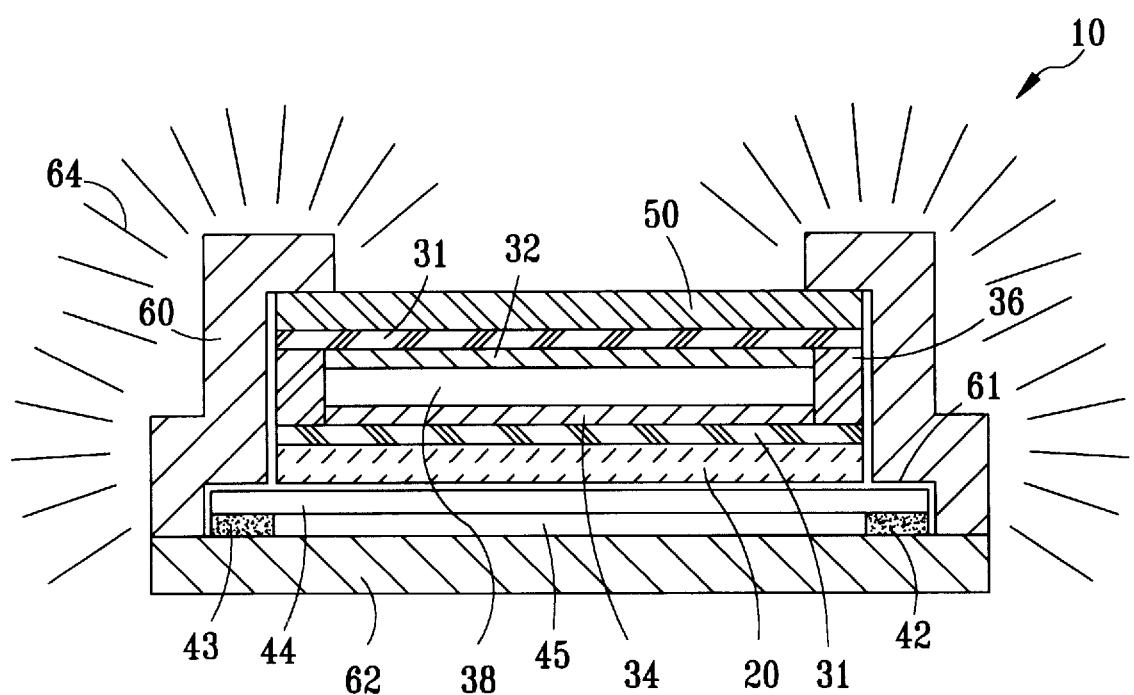
FIG. 6 is a cross section of the layered structure of FIG. 5 taken transverse to the longitudinal direction.

A third embodiment, illustrated in FIGS. 5 and 6, is designed so that layered structure 12b includes an electroluminescent panel 40a is located beneath stiffener board 20. In this embodiment, the electroluminescent material 43 is confined to a periphery 47 of transparent film 44 leaving an air space 45 in the central portion of panel 40a. The electroluminescent structure of panel 40a is similar that of FIG. 4, other than being confined to a periphery. Furthermore, as can be seen in FIG. 6, the luminescent periphery 47 of electroluminescent panel 40a extends beyond stiffener board 20 and under a lip 61 of cover 60. In this embodiment, light 64 does not shine directly through transparent sheet 50 as stiffener board 20 and membrane potentiometer 30 do not transmit light. Instead, light 64 is conducted through cover 60 and exits the top and side surfaces thereof to illuminate controller 10.

REMARKS ABOUT THE PREFERRED EMBODIMENT

This design offers an advantage over the prior art in that an illuminated controller is provided that provides a soothing easy to spot light over a surface area of the controller as opposed to a single point source of light. Furthermore, the invention provides a reliable and cost effective design to accomplish the foregoing. Another unique aspect of the invention is that it is operated by pressing through the electroluminescent panel incorporated in the controller.

One of ordinary skill in the art of designing and using controllers of the type disclosed will realize a device of this type can be used to adjust the voltage of a multitude of mechanisms such as a light fixture or volume of a stereo. The controller receives a first voltage and outputs a second voltage, which is a fraction or percentage of the first voltage. Typically, the voltage is adjusted by a user pressing a finger against transparent sheet 50. This causes conductive layer 32 to touch resistive layer 34 at the point pressed. Accordingly, the electronics (not shown) will detect the change of resistance in the circuit and adjust the voltage to the device to be controlled. The graphics on transparent sheet 50, which are illuminated by electroluminescent panel 30, show the user where to press to adjust the voltage level of the device to the desired setting. Furthermore, transparent sheet 50 provides an additional layer of electrical insulation to protect the user from electrical shock if a lower layer were to tear.

VARIATIONS OF THE PREFERRED EMBODIMENT

Although the illustrated embodiments display specific designs of the shape of controller 10, one skilled in the art will realize that the preferred embodiment would work with most any shape. For example, the controller could be round, oval or triangular without departing from the disclosed structure. It is also contemplated that the transparent sheet 50 be provided without graphics as the cover could be used to impart control information to the user via molded in designs, stickers or painted designs.

Connectors 32 and 42 can also be varied from the pins shown in the preferred embodiments. Any type of electrical connection known in the art could be used without departing from the scope of the invention. Also, the backplate 62 and cover 60 could be varied in innumerable ways. For example, screws could be used to secure the cover instead of the tabs depicted in FIG. 1. Backplate 62 and cover 60 could even be molded as a single unit. Another option would be to make a portion of cover 60 opaque in the third embodiment so that a desired pattern or design is illuminated on it.

Additionally, it is contemplated that in the first and second embodiment, backplate 62 could also serve as the stiffener board so that conductive layer 32 will come in contact with resistive layer 34 when pressure is applied to transparent layer 50.

Another alternative is to add an actuator such as a slide adjustment that would be moved by a user. The slide would be designed such that it will press conductive layer 32 and resistive layer 34 together at the point where the slide is positioned.

In the third preferred embodiment, the electroluminescent material 43 is only placed around the periphery of panel 40*a* to save material; however, the entire panel could just as easily be made luminescent. Likewise, the electroluminescent material in the first and second embodiments could be limited to the periphery of panel 40 or 30*a*, or in the alternative the electroluminescent material could be deposited in any design desired to be illuminated. Another variation of the third embodiment would be to direct light through the cover using fiber optics or light-piping.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States patent is:

1. A controller that is illuminated, for receiving a first voltage and outputting a second voltage, comprising:
   a) a backplate for providing a sturdy base for the controller;
   b) a cover, having sidewalls and a top wall which has a central opening defining a cavity therein, for mounting on the backplate;
   c) a membrane potentiometer, interposed between the cover and the backplate, for receiving a first voltage, outputting a second voltage that is a percentage of the first voltage; and
   d) an electroluminescent panel, interposed between the cover and the membrane potentiometer, for generating a light to illuminate the controller and being exposed through the central opening, the top wall extending over and retaining the membrane potentiometer and the electroluminescent panel to the backplate.

2. The controller of claim 1, further including an electrically insulative sheet, located above the membrane potentiometer and electroluminescent panel but beneath the cover.

3. The controller of claim 2, wherein the electrically insulative sheet is transparent.

4. The controller of claim 2, wherein the electrically insulative sheet has graphic overlays to aid the user in controlling the controller.

5. The controller of claim 1, wherein the membrane potentiometer and electroluminescent panel are formed between common flexible films.

6. The controller of claim 1, further comprising a stiffener board for pressing the membrane potentiometer thereagainst.

7. The controller of claim 1, wherein the cover is transparent and light from the electroluminescent panel is transmitted therethrough.

8. The controller of claim 7, wherein the electroluminescent panel extends beyond the membrane potentiometer and the stiffener board.

9. The controller of claim 1, wherein light generation is restricted to a periphery of the electroluminescent panel.

10. The controller of claim 1, wherein a plurality of electrical terminations for both the membrane potentiometer and electroluminescent panel are mounted on common film layers and the electrical terminations extend through a slot in the backplate.

11. A controller that is illuminated for receiving a first voltage and outputting a second voltage, comprising:
    a) a backplate for providing a sturdy base for the controller;
    b) a light transmissive cover, having sidewalls and a top wall with a central opening, for mounting on the backplate;
    c) a membrane potentiometer, interposed between the membrane potentiometer and the backplate, for receiving a first voltage, outputting a second voltage that is a percentage of the first voltage; and
    d) an illumination means, interposed between the cover and the backplate for illuminating at least a portion of the cover by transmitting light through the side and top walls.

12. The controller of claim 11, wherein the illumination means comprises an electroluminescent panel for generating light.

13. The controller of claim 12, wherein the cover is light transmissive for transmitting light to illuminate the controller.

14. The controller of claim 12, wherein the cover comprises light piping for illuminating selected portions of the controller.

15. The controller of claim 12, wherein the cover comprises fiber optics for illuminating selected portions of the controller.

16. The controller of claim 11, wherein a plurality of electrical connectors attached to both the membrane potentiometer and electroluminescent panel extend through a slot in the backplate.

17. The controller of claim 11, wherein the membrane potentiometer prevents light from being directly transmitted through the central opening.

\* \* \* \* \*